(12) United States Patent
Nuggehalli et al.

(10) Patent No.: US 9,460,301 B2
(45) Date of Patent: Oct. 4, 2016

(54) CONFIGURABLE LOCKED PRINTING

(75) Inventors: Jayasimha Nuggehalli, Cupertino, CA (US); Jiang Hong, San Jose, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/205,348

(22) Filed: Aug. 8, 2011

(65) Prior Publication Data

US 2013/0038898 A1    Feb. 14, 2013

(51) Int. Cl.
G06F 3/12          (2006.01)
G06F 21/60         (2013.01)

(52) U.S. Cl.
CPC .......... *G06F 21/608* (2013.01); *G06F 3/1222* (2013.01); *G06F 3/1238* (2013.01); *G06F 3/1267* (2013.01); *G06F 3/1288* (2013.01); *G06F 3/1256* (2013.01)

(58) Field of Classification Search
None
See application file for complete search history.

(56) References Cited

U.S. PATENT DOCUMENTS

| | | | |
|---|---|---|---|
| 6,192,407 B1 * | 2/2001 | Smith et al. ................. | 709/229 |
| 6,307,640 B1 * | 10/2001 | Motegi ........................ | 358/1.14 |
| 7,755,786 B2 * | 7/2010 | Foehr .................... | G06F 3/1206 358/1.13 |
| 8,169,627 B2 * | 5/2012 | Kudo et al. .................. | 358/1.13 |
| 8,780,381 B2 * | 7/2014 | Truong ................. | G06F 3/1205 358/1.15 |
| 2002/0083114 A1 | 6/2002 | Mazzagatte et al. | |
| 2002/0101608 A1 * | 8/2002 | Whitmarsh .................. | 358/1.15 |
| 2003/0038965 A1 * | 2/2003 | Simpson et al. ............. | 358/1.15 |
| 2003/0067625 A1 * | 4/2003 | Kim ............................. | 358/1.15 |
| 2004/0001217 A1 | 1/2004 | Wu | |
| 2005/0005047 A1 | 1/2005 | Keeney et al. | |
| 2006/0227368 A1 | 10/2006 | Hong | |
| 2007/0177920 A1 | 8/2007 | Katano et al. | |
| 2007/0229926 A1 * | 10/2007 | Morisaki et al. ............. | 358/527 |
| 2007/0247664 A1 | 10/2007 | Yamamoto | |
| 2008/0055627 A1 | 3/2008 | Ellis | |
| 2010/0182630 A1 | 7/2010 | Jethani et al. | |
| 2010/0277756 A1 | 11/2010 | Merriam | |
| 2011/0188063 A1 * | 8/2011 | Nuggehalli ........... | G06F 3/1236 358/1.13 |

(Continued)

FOREIGN PATENT DOCUMENTS

| | | |
|---|---|---|
| JP | 2006106977 | 4/2006 |
| JP | 2008097239 A | 4/2008 |

OTHER PUBLICATIONS

U.S. Appl. No. 13/327,543, filed Dec. 15, 2011, Office Action, Jul. 31, 2013.

(Continued)

*Primary Examiner* — Paul F Payer
(74) *Attorney, Agent, or Firm* — Hickman Palermo Becker Bingham LLP

(57) ABSTRACT

Techniques are provided for generating and updating locked print data. An apparatus receives from a first device, document identification data that identifies an electronic document to be printed. In response to receiving the document identification data that identifies an electronic document to be printed, a print preview and a release code for the electronic document are generated. The apparatus sends the print preview and the release code to the first device. The apparatus receives, from a printing device, the release code and print criteria that indicate one or more portions of the electronic document to be printed. The one or more portions of the electronic document comprise less than the entire electronic document. In response to receiving the release code and the print criteria from the printing device, the apparatus provides, to the printing device, print data that includes the one or more portions of the electronic document.

20 Claims, 5 Drawing Sheets

(56) References Cited

U.S. PATENT DOCUMENTS

2011/0299110 A1 12/2011 Jazayeri et al.
2013/0070278 A1 3/2013 Cochran et al.

OTHER PUBLICATIONS

U.S. Appl. No. 13/327,543, filed Dec. 15, 2011, Office Action, Jun. 17, 2015.
U.S. Appl. No. 13/327,543, filed Dec. 15, 2011, Office Action, May 19, 2014.
U.S. Appl. No. 13/327,543, filed Dec. 15, 2011, Office Action, Feb. 10, 2016.
U.S. Appl. No. 13/327,543, filed Dec. 15, 2011, Interview Summary, Dec. 14, 2015.
U.S. Appl. No. 13/327,543, filed Dec. 15, 2011, Final Office Action, Feb. 13, 2015.
U.S. Appl. No. 13/327,543, filed Dec. 15, 2011, Advisory Action, Feb. 1, 2016.
U.S. Appl. No. 13/327,543, filed Dec. 15, 2011, Examiner Interview, Apr. 30, 2015.
U.S. Appl. No. 13/327,543, filed Dec. 15, 2011, Final Office Action, Oct. 21, 2015.
Japan Foreign Office Action in application No. JP 2012-173676, dated Jun. 14, 2016, 2 pages.

\* cited by examiner

CONFIGURABLE LOCKED PRINTING

FIELD OF THE INVENTION

The present disclosure relates generally to locked printing and, more specifically, to configuring a locked print data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Conventional techniques for employing a multi-functional peripheral (MFP) to scan, print or to otherwise process data often require a user to authenticate to the MFP before the MFP performs or completes a particular request. For instance, the user may be required to provide a username, password, and/or job release code via an interface of the MFP to access a pending print request. The process of user-authentication at the MFP can be error-prone, tedious and time-consuming for various reasons.

For example, when a release code is required to unlock a pending print request, the user may have limited or no knowledge of the document associated with the release code. This problem may be exacerbated when a user needs to manage multiple release codes for different print requests. Furthermore, once the release code for the print job has been created, the user has no choice in selecting specific portions of the document to print. The user typically enters the release code at the MFP, causing the MFP to print the entire document, which may unnecessarily waste printing resources and the user's time.

SUMMARY

Techniques are provided for allowing a user to select one or more portions of a pending locked print data to print. In one embodiment, a system, such as a print server, receives, from a first device, document identification data that identifies an electronic document to be printed. In response to receiving the document identification data that identifies the electronic document to be printed, the system generates a print preview for the electronic document and a release code for the electronic document. The system sends the print preview and the release code to the first device. The system receives the release code and one or more print criteria from a printing device. The one or more print criteria indicate one or more portions of the electronic document to be printed. The one or more portions comprise less than the entire electronic document. In response to receiving the release code and the one or more print criteria from the printing device, the system provides, to the printing device, print data that includes the one or more portions of the electronic document.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0 GENERAL OVERVIEW
2.0 STRUCTURAL OVERVIEW
3.0. GENERATING AND CONFIGURING LOCKED PRINT DATA
   3.1 GENERATING PRINT AND PREVIEW DATA FOR THE LOCKED PRINT DATA
   3.2 SELECTING PORTIONS OF A DOCUMENT FOR PRINTING
   3.3 GENERATING AND USING A RELEASE CODE
   3.4 USING EMAIL FOR CONVENIENT LOCKED PRINTING
4.0 USING A PRINTING DEVICE TO RELEASE LOCKED PRINT DATA
5.0. IMPLEMENTATION MECHANISMS

1.0 General Overview

An approach is provided for generating a release code and thumbnail images, which can be used to configure and unlock print data for printing at a printing device. According to embodiments described herein, the release code and thumbnail images may be used to select and print only a portion of locked print data.

2.0 System Architecture

Figure 1:
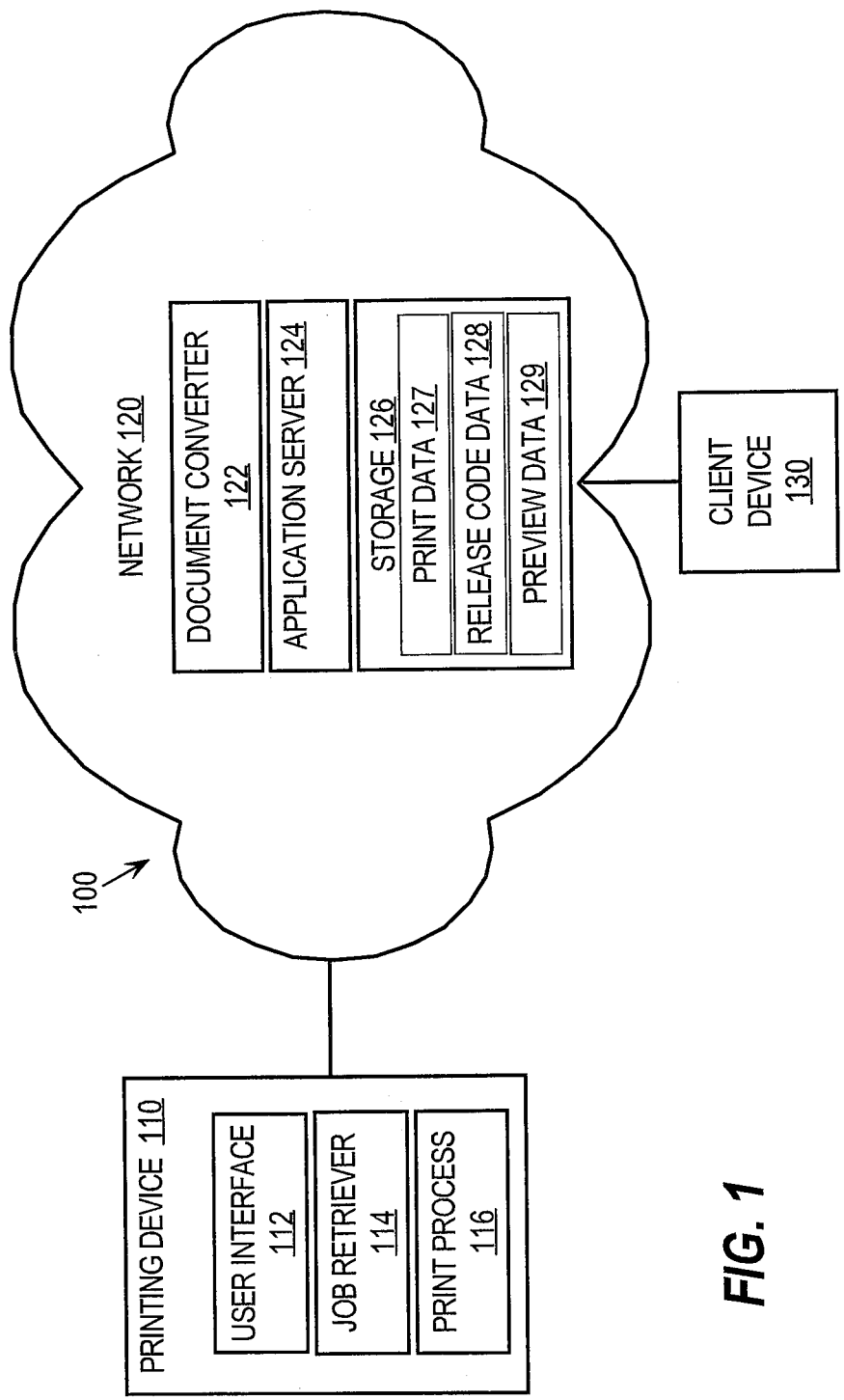
FIG. 1 is a block diagram that depicts an example system architecture for processing locked print data, according to an embodiment.

FIG. 1 is a block diagram depicting example system architecture 100 for processing locked print data according to an embodiment. Architecture 100 includes printing device 110 and client device 130, which are communicatively coupled to network services of network 120. The network services of network 120 include document converter 122, application server 124, and storage 126. The communications links between elements of network 120 and each of printing device 110 and client device 130 may be implemented by any medium or mechanism that provides for the exchange of data between each of these elements. Examples of such links include, without limitation, a network such as a Local Area Network (LAN), Wide Area Network (WAN), Ethernet or the Internet, or one or more terrestrial, satellite or wireless links. Alternatively or in addition, client device 130 and printing device 110 may be directly connected through a communications link.

Client device 130 may be any network device that requests an electronic document to be processed, such as a workstation, email server, desktop computer, laptop computer, mobile phone, tablet computer, personal digital assistant (PDA) or other handheld device. In one embodiment, client device 130 is configured to communicate with one or more network services in network 120. For example, client device 130 may be configured to send requests to print an electronic document and to process corresponding replies from network services in network 120.

Printing device 110 is a network device that is configured to communicate with one or more network services of network 120 to process and print various document data. Printing device 110 may generally comprise a plurality of components, such as user interface 112, job retriever 114, and print process 116. Printing device 110 may include other modules and processes that are not depicted in FIG. 1 for purposes of brevity.

Figure 4:
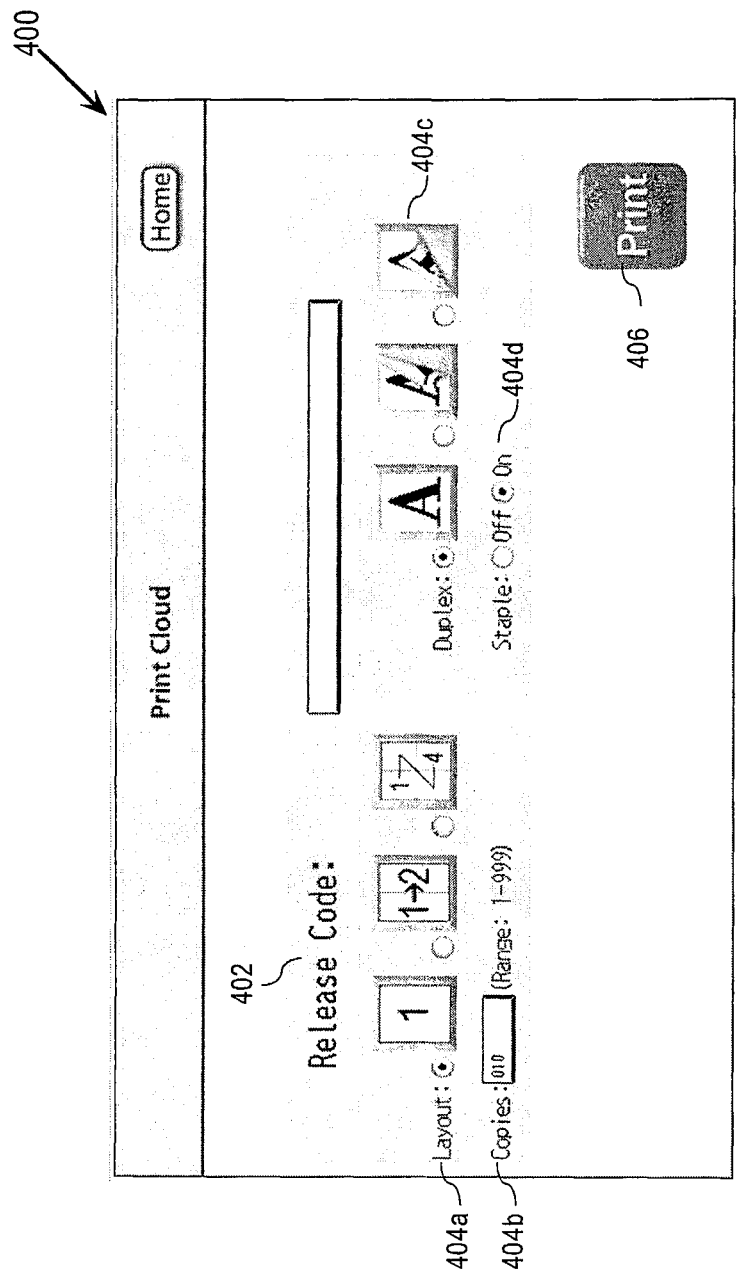
FIG. 4 depicts an example operation panel of an MFP, according to an embodiment.

User interface 112 is configured to display information to a user and to accept user input. Implementations of user interface 112 may vary depending upon architecture of printing device 110. In an embodiment, user interface 112 can include a display having a touch-screen portion, on which a graphical user interface (GUI) can be displayed. The touch screen can allow a user to select icons and/or other GUI objects to input job identification data, select print criteria, and otherwise control operation of printing device 110. Alternatively or in addition, user interface 112 may also include control buttons and a numeric keypad for performing these functions. An example user interface is depicted in FIG. 4, which is described in more detail below.

In an embodiment, user interface 112 includes an application that executes on printing device 110 to retrieve one or more user interface elements from application server 124. For example, user interface 112 may be a browser application that displays Hypertext Markup Language (HTML) elements received from application server 124. A user may interact with the HTML elements displayed by printing device 110 to control operation of print process 116. Alternatively, the application(s) that control user interface 112 may be completely embedded in printing device 110 and may be stored in volatile or non-volatile storage of printing device 110.

Job retriever 114 is configured to retrieve print data from one or more network services in network 120. For instance, job retriever 114 may provide a release code, received through user interface 112, to application server 124 in order to request print data. In an embodiment, job retriever 114 is also configured to provide print criteria to one or more network services in network 120 to configure the print data prior to printing. For example, job retriever may send data to application server 124 that identifies a portion of a document to print.

As used herein print data may comprise any data that can be used by printing device 110 to print an electronic document. Examples print data may include, but is not limited to, a printable or non-printable format of an electronic document, Printer Command Language (PCL) data or other Page Description Language (PDL) data for the electronic document and print option data that identifies the print options printing device 110 should use to print the electronic document.

Print process 116 is configured to cause one or more documents to be printed by printing device 110 based on corresponding print data. Print process 116 may be initiated, for example, in response to a user selecting a print-start control button and/or a user inputting a release code to printing device 110.

Network 120 includes one or more network services used to process and configure print data. Network 120 may generally comprise a plurality of components, such as document converter 122, application server 124, and storage 126. Network 120 may include other modules and processes that are not depicted in FIG. 1 for purposes of brevity. Document converter 122 and application server 124 may be software, or a combination of software and hardware that execute on one or more network devices within network 120. In one embodiment, one or more of these components is executed on a print server. In another embodiment, one or more of these components, such as application server 124, may be software, such as firmware, executed by printing device 110 or client device 130.

Document converter 122 is configured to receive document identification data from client device 130 and to generate print data in response to receiving the document identification data. In an embodiment, document converter 122 is also configured to generate a release code and preview data for a requested print job. Alternatively, other component(s) (not shown) in network 120 may generate the release code and/or preview data for the print data. Document converter 122 stores print data 127, release code data 128, and preview data 129 for a requested print job in storage 126.

Application server 124 is configured to receive and respond to requests from printing device 110. In an embodiment, application server 124 is configured to retrieve print data that is associated with a received release code. For example, application server 124 may retrieve the print data directly from storage 126, or may request the print data from another network service in network 120, such as document converter 122. In an embodiment, application server 124 is configured to receive print criteria from printing device 110 and to update particular print data based on the print criteria. Examples for updating print data are provided further below.

Storage 126 may be implemented as any type of volatile or non-volatile storage for storing data used by printing device 110 to perform printing operations. As depicted in FIG. 1, data stored by storage 126 include print data 127, release code data 128 and preview data 129. Print data 127 includes data for an electronic document that is used by print process 116 to print the electronic document. Release code data 128 includes one or more release codes for locked print data stored in print data 127. Preview data 129 includes one or more print previews for print data 127 and may comprise print previews for one or more electronic documents associated with one or more print requests.

3.0 Generating and Configuring Locked Print Data

When a user of client device 130 wishes to print an electronic document, the user causes client device 130 to send document identification data for the electronic document to one or more components in network 120. In response, a release code and preview data are generated for a print request, which the user can then use to selectively release and print one or more portions of the electronic document at a printing device.

Figure 2:
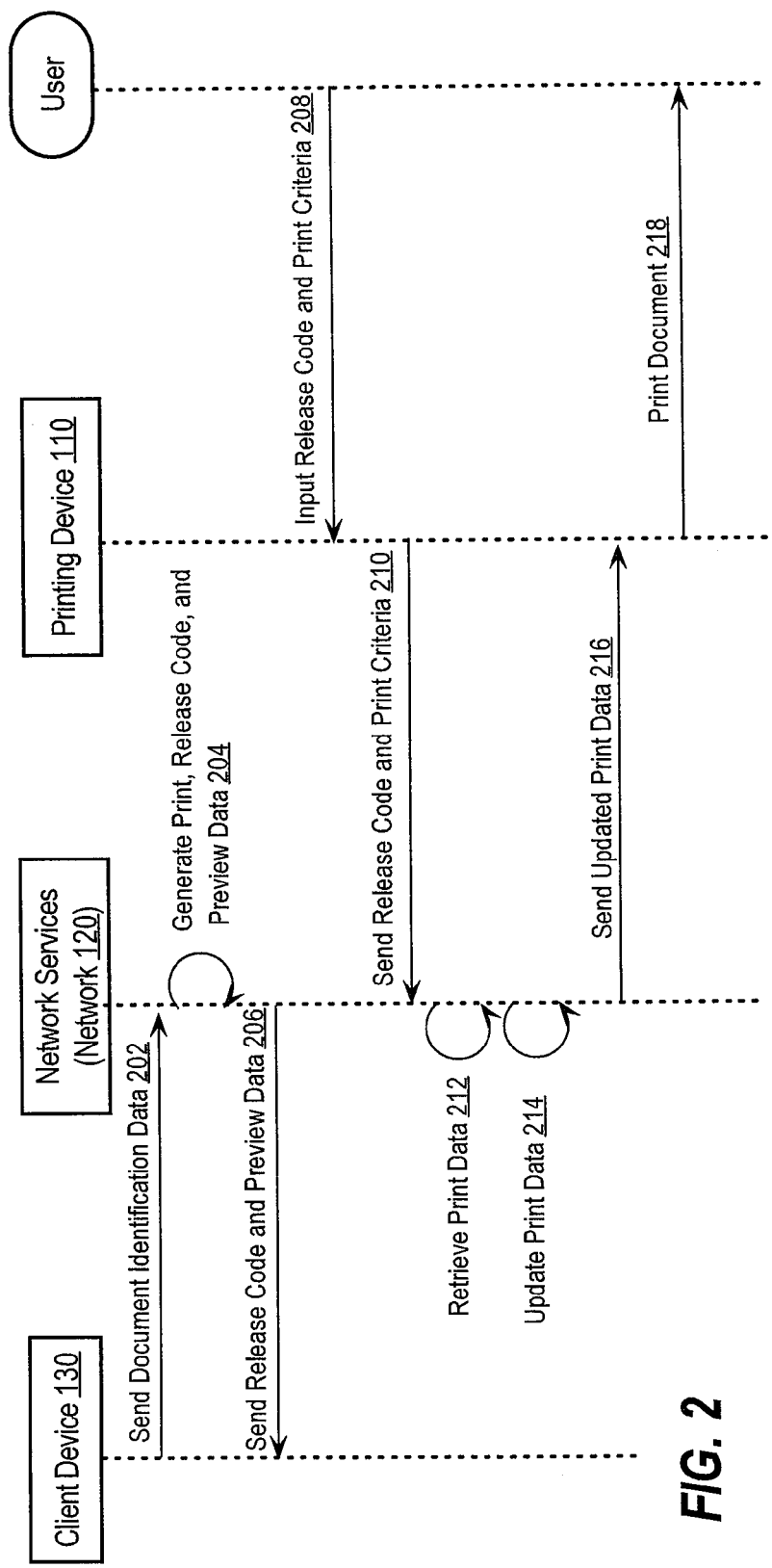
FIG. 2 is a flow diagram depicting communications exchanged between a client device, one or more devices in a network, and a printing device, according to an embodiment.

FIG. 2 is a flow diagram depicting example communications exchanged between a client device, one or more devices in a network, and a printing device according to an embodiment.

In step 202, client device 130 sends document identification data 202 to one or more network services in network 120, such as document converter 122. The document identification data identifies a document that an end user wishes to print. The form and content of the document identification data may vary from implementation to implementation. In one embodiment, the document identification data sent by client device 130 includes the electronic document itself, in an encrypted or unencrypted format. In another embodiment, the document identification data includes a reference to the electronic document, such as a Universal Resource Locator (URL).

Upon receiving the document identification data, in step 204, the one or more network services in network 120 generate print data, release code and preview data for the electronic document. In one embodiment, this step is performed by document converter 122. Alternatively, the release code and/or the preview data may be generated by a separate network service (not shown) or application server 124 in network 120.

In step 206, one or more network services in network 120 send the release code and preview data to client device 130. The preview data may include image data, non-image data, or any combination of image data and non-image data, as described further below.

In step 208, the user inputs the release code and print criteria using the user interface 112 of printing device 110. The user may enter this information using an operation panel of a MFP similar to that illustrated in FIG. 4.

In step 210, printing device 110 sends the release code and print criteria to one or more network services in network 120. In an example embodiment, job retriever 114 of printing device 110 establishes a connection with application server 124. In response to receiving the release code and print criteria through user interface 112, job retriever 114 sends the information to application server 124.

In step 212, upon receiving the release code and print criteria, one or more network services in network 120 retrieve the print data associated with the release code. For example, application server 124 may retrieve the print data from storage 126 based on the release code sent by job retriever 114. Alternatively, application server 124 may retrieve the print data by requesting the print data from another network service, such a document converter 122, which accesses storage 126 to retrieve the print data. In an embodiment, retrieving the print data comprises retrieving a printable format of an electronic document associated with the release code.

In step 214, one or more network services in network 120 update the print data based on the print criteria received from the printing device. In an embodiment, application server 124 updates the print data by generating a new electronic document by applying the print criteria to the electronic document associated with the release code.

In step 216, one or more network service in network 120 send the updated print data to printing device 110. In an embodiment, this step comprises application server 124 sending print data for the new electronic document to job retriever 114. For example, application server 124 may send a printable format of the new electronic document to printing device 110.

In step 218, printing device 110 prints a document based on the updated print data. In an example embodiment, job retriever 114 receives print data for the new electronic document from application server 124. Job retriever 114 provides this updated print data to print process 116. In response, print process 116 processes the updated print data to print the new electronic document.

In alternative embodiments, one or more steps illustrated in FIG. 2 as performed by network services on network in network 120 may be performed by printing device 110, client device 130, or other devices or modules not expressly depicted in FIG. 1. For example, the generation of print data, preview data, and/or the release code may be performed by an application stored and executed by printing device 110, client device 130, or any other network device that is communicatively coupled to printing device 110 and client device 130.

3.1 Generating Preview and Other Data for the Locked Print Data

When a user sends document identification data from client device 130, print data and preview data are generated for a new print request. In an embodiment, the document converter 122 generates the print data by converting the electronic document, associated with the document identification data, into a printable format, such as a portable document format (PDF). In another embodiment, the print data is generated by rasterizing the electronic document. Rasterization is a process by which a two-dimensional image is converted from a vector based format into pixels or dots for output on a printing device, such as printing device 110.

The preview data comprises a print preview that indicates which electronic document(s) will be printed for a particular print request. The print preview is returned with the release code to a user, allowing the user to easily identify which electronic document will be printed when the release code is entered at a printing device and also allowing a user to view portions of the electronic document that the user might want to print.

In one embodiment, the print preview comprises image data. For example, the preview data may include one or more thumbnail images for the electronic document. Each thumbnail image may correspond to a different page of the electronic document. The thumbnail images may be generated by rasterizing the electronic document into any suitable raster format, including, but not limited to a PDF with raster images, JPEG, TIFF, GIF, RAW, PNG, or BMP file. The image file containing the one or more thumbnails is returned to the user as a print preview.

In another embodiment, the print preview comprises non-image data. For example, the electronic document may be converted into a text-based file where each page of the text-based file corresponds to a page that will be printed for the document. The text document is returned to the user as a print preview. The text document may also comprise image data, such as images embedded in the text-based file.

Figure 3:
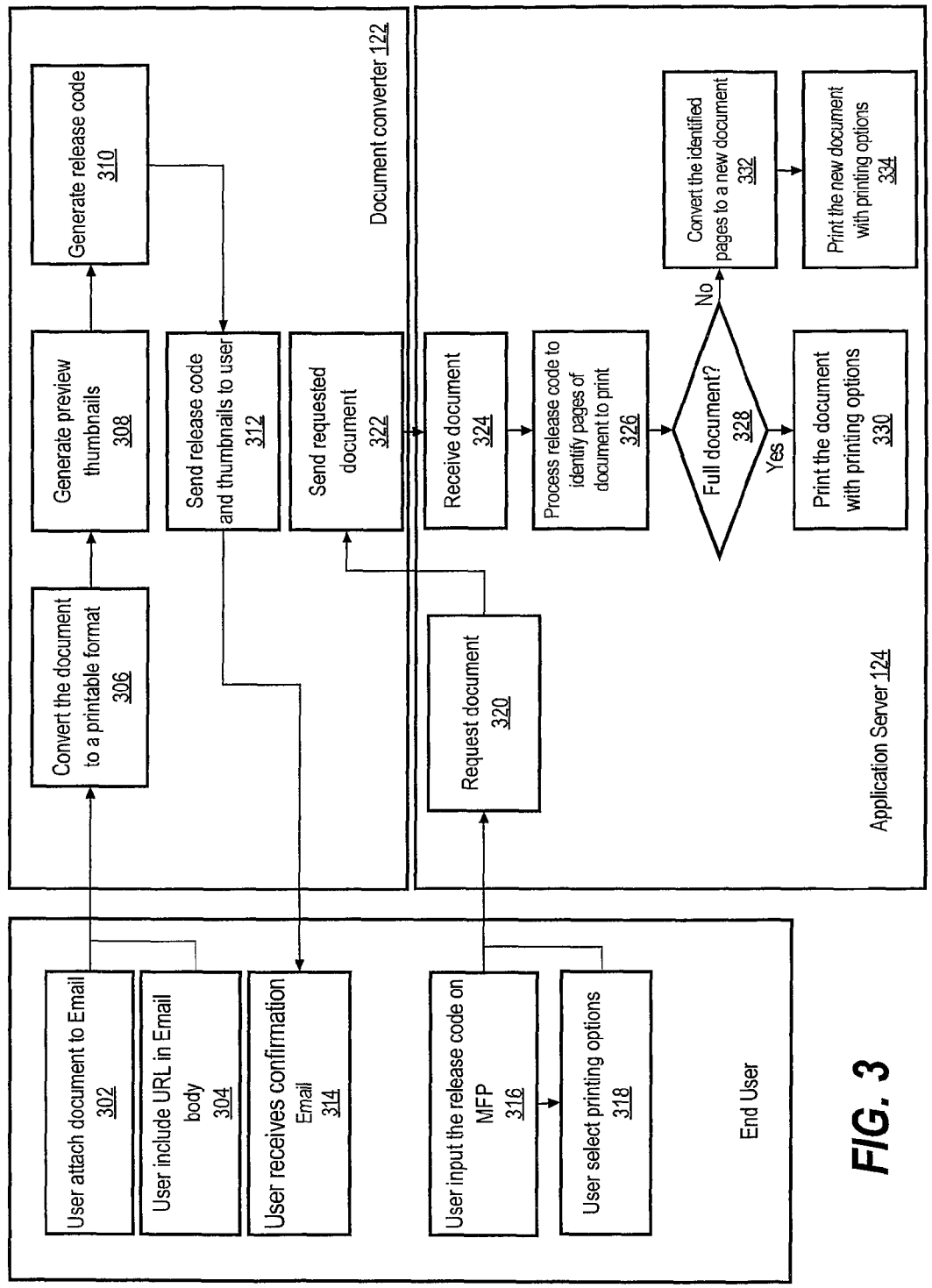
FIG. 3 is a flow diagram depicting an approach for configuring locked print data, according to an embodiment.

When the print preview is returned, the client device may store data that associates the release code with the print preview. This data may take on any suitable form that allows the user to identify which print preview is associated with a particular release code. In an example embodiment, the release code and print preview are returned in the same email message, which the client device stores. The user may easily identify which electronic document is associated with a release code, for example, by accessing the email message reply for the print request. The process of using email to configure locked print data is illustrated in FIG. 3 and described in further detail below. In another example, the client device executes an application that configured to manage and display the print preview data. The application may be, for example, a mobile application designed for use on a mobile phone or other mobile device. In one embodiment, the client device is configured to search for a print preview that matches a release code. For example, a user may enter a release code and, in response, client device 130 retrieves the print preview associated with the release code and causes it to be displayed to the user.

3.2 Selecting Portions of a Document for Printing

In an embodiment, the print criteria identify one more portions of the electronic document to be printed. For example, the print criteria may specify individual pages and/or a page range of an electronic document that the user wishes to print.

In an embodiment, user interface 112 is configured to allow the user to input the pages that should be printed for locked print data. Referring again to FIG. 2, in step 208, the user may input, using user interface 112, the pages that the user wishes to print. During this step, the user may use the print preview as an aide to determine which pages are desired for printing. For example, the user may browse thumbnail images of the print preview to identify the pages that the user would like to print. After the user has selected the desired pages, printing device 110 sends, in step 210, the print criteria that identify the desired pages to one or more network services, such as application server 124.

In step 214, application server 124 configures the locked print data by applying the print criteria to the electronic document to generate a new electronic document that includes only those portions of the electronic document identified by the print criteria. In one embodiment, application server 124 generates print data for the new electronic document. In an alternative embodiment, document converter 122 may generate the print data for the new electronic document. In step 216, application server 124 provides the print data for the new electronic document to printing device 110, causing printing device 110 to print, in step 218, only those portions of the electronic document identified by the print criteria.

3.3 Generating and Using a Release Code

In an embodiment, when a client device requests that an electronic document be printed, print data is generated and stored or "locked" until the user enters a release code at a printing device. This ensures that the user is properly authenticated before print data is accessed and prevents unauthorized printing of an electronic document. The print data may optionally be associated with a username and password. Accordingly, to unlock the print data, the user may be required to enter the username and password at the printing device in addition to the release code.

The release code may be any data that identifies particular print data. Thus, a release code can be represented in a variety of ways. For example, a release code can be represented by a unique alphanumeric string, containing letters, digits and special characters. The string can have a fixed or variable length. According to another example, a job identifier can be a hexadecimal number, binary number or a number represented in any number-representation-notation. The release code may be generated on a random basis, such as by a random number generator, or on an ordered basis, such as by a sequential counter. Example release codes are given in TABLE 1 below.

When the user wishes to configure and execute locked print data, the user enters the release code and print criteria at a printing device. In one embodiment, the user may specify both the release code and print criteria using a modified version of the release code. For example, the modified release code may comprise the initial release code (i.e., the release code initially returned to the client device 130 in step 206) and additional information that specifies the print criteria. The additional information may be added as a prefix or suffix to the initial release code. Examples of modifications to a release code and their corresponding functions are given in TABLE 1 below.

The user may manually enter the modified release code on printing device 110 via user interface 112. Alternatively, printing device 110 may automatically generate the modified release code in response to the user selecting print criteria through other user interface elements.

Upon receiving the modified release code, application server 124 parses the modified release code to determine the initial release code and the print criteria. The application server 124 uses the initial release code portion of the modified release code to determine which print data should be retrieved and the print criteria portion of the modified release code to determine how the print data should be configured.

TABLE 1, shown below, illustrates example modifications to a release code and the corresponding function of the release code, according to an embodiment.

TABLE 1

| RELEASE CODE | FUNCTION |
| --- | --- |
| 87654321 | Print the whole document |
| 87654321-10 | Print only page 10 of the document |
| 87654321-12 + 19 | Print page 12 and page 19 of the document |
| 87654321-5_9 | Print page 5 to page 9 of the document |

The first release code illustrated, "87654321", is an unmodified release code to which no print criteria have been added. If this release code is input into the printing device by a user, then the printing device prints the entire electronic document associated with the release code. In the second instance, the release code has been modified by adding the suffix "–10". This release code causes the printing device to print only page 10 of the electronic document associated with the initial release code. Similarly, adding the suffix "–12+19" to the release code causes the printing device to print page 12 and page 19 of the electronic document, and adding "5_9" causes the printing device to print page 5 to page 9 of the electronic document.

The example release codes and modifications shown in TABLE 1 are for purposes of illustration only. The syntax of the release code and modifications may vary from implementation to implementation. For example, the print criteria may be added as a prefix or to any other portion of the release code. Furthermore, the delimiters for adding the print criteria, separating pages and specifying page ranges may differ from those illustrated above. For instance, pages may be separated by a comma, semicolon, or other character(s) instead of a "+" character. Similarly, other character(s) may be used in place of the "-" to demarcate a suffix and the "_" to specify a page range.

3.4 Using Email for Convenient Locked Printing

In one embodiment, email messages are used to exchange information, such as sending the document identification data, the release code, and the print preview. Email provides a flexible and convenient solution for the user to access the release code and print preview because email is typically accessible to a plurality of network devices. For example, the user may email the document identification from a desktop device and view the print preview and release code on a mobile device, while standing next to the printing device. When sent, the email may be routed through an email server, such as specified by the Simple Mail Transfer Protocol (SMTP). In response, the print server sends a reply email including the print preview and the release code to the email server. Thus, user may logon to the email server to view the reply email from any compatible network device.

FIG. 3 is a flow diagram depicting an approach for allowing a user to select, for printing, portions of an electronic document, according to an embodiment.

Steps 302, 310, 316, and 318 illustrate steps performed by an end user. In step 302 the user attaches a document to an email. Alternatively, in step 304, the user may include, in the body of an email, a URL that identifies the document to print. The attached document or the URL comprises the document identification data that is sent to document converter 122.

Steps 306 to 312 and step 322 are performed by document converter 122, according to an embodiment. In step 306, the document is converted into a printable format. In an embodiment, this step comprises converting the document attached to the body of the email or the document identified by the URL to a PDF file. In step 308, preview thumbnails are generated for the print data. In an embodiment, a thumbnail image is generated for each page in the PDF file based on how each page will look when printed. In step 310, a release code is generated for the print data. In step 312, the release code and the preview thumbnails are sent to the user. In one embodiment, document converter 122 generates and sends an email that includes the release code and thumbnail images. The thumbnail images and/or release code may be included in the email body or as an attachment.

Referring again to the steps performed by the end user, in step 314, the user receives a confirmation email that includes the release code and the preview thumbnails. The user may access the release code and the preview thumbnails using any network device that has access to an email server according to an embodiment. In step 316, the user inputs the release code on an MFP. In step 318, the user selects printing options for the pending print request. The printing options may include, but are not limited to, configuring the layout of the electronic document, enabling/disabling duplex printing, selecting the number of copies to be printed, and enabling/disabling stapling of the printed document.

Steps 320 and 324 to 334 are performed by application server 124 according to an embodiment. In step 320, application server 124 requests from document converter 122, the electronic document associated with the release code. In step 322, document converter 122 sends the requested document to application server 124. In step 324, application server 124 receives electronic document. In step 326, application server 124 processes the release code to identify pages of the electronic document to print. In step 328, application server 124 determines whether the full electronic document should be printed based on the processed release code. For example, if the release code has not been modified, then in step 330, application server 124 causes printing device 110 to print the full electronic document with the printing options that the user has selected. If the release code has been modified to include additional information that identifies the portions of the electronic document to print, then in step 332, application server 124 converts the identified pages to a new document. In other words, any pages not selected by the user are not included in the new document. In step 334, application server 124 causes printing device 110 to print the new document by sending print data for the new document. In an alternative embodiment, application server 124 may send print data for the entire electronic document and printing device 110 may apply the print criteria to generate and print the new document.

In alternative embodiments, one or more steps illustrated in FIG. 3 as performed by document converter 122 may be performed by application server 124, printing device 110, client device 130, or other elements not expressly depicted. Similarly, one or more steps illustrated in FIG. 3 as performed by application server 124 may be performed by document converter 122, printing device 110, client device 130, or other elements not expressly depicted. For example, document converter 122 may generate the print data for the new electronic document.

4.0 Using a Printing Device to Release Locked Print Data

When the user wishes to update and/or execute a pending print request, the user enters the release code and print criteria (if any) at a printing device. In an embodiment, the print request may be executed by any of a plurality of compatible printing devices. Each of the compatible printing devices may be in a different physical location and/or on a different network or subnetwork. Accordingly, the user may select any of the compatible printing devices and enter the release code and print criteria to execute a print request. Alternatively, the locked print data may be confined to an authorized set of one or more printers. Accordingly, the user may only execute the print request by entering the release code at an authorized printer.

To enter the release code and print criteria, the user may use an operation panel of an MFP similar to that illustrated in FIG. 4. Operation panel 400 includes release code entry field 402 in which a user may enter a release code or modified release code for a particular print request. For example, any of the release codes illustrated in TABLE 1 may be input by the user into release code field 402.

The user may use operation panel 400 to select print options to configure the manner in which the printing device will print the electronic document associated with the release code. For example, the user may configure the layout of the printed document using layout control 404a, the number of copies the printer will print using copy control 404b, the duplexing of the printed document using duplex control 404c, and the stapling of the printed document using staple control 404d.

Once the user has input the release code and print options, the user may select print button 406 to print the one or more portions of the electronic document identified by the release code according to the specified print options. Selecting print button 406 causes job retriever 114 to retrieve the configured print data and print process 116 to print the electronic document, according to techniques described above.

5.0 Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
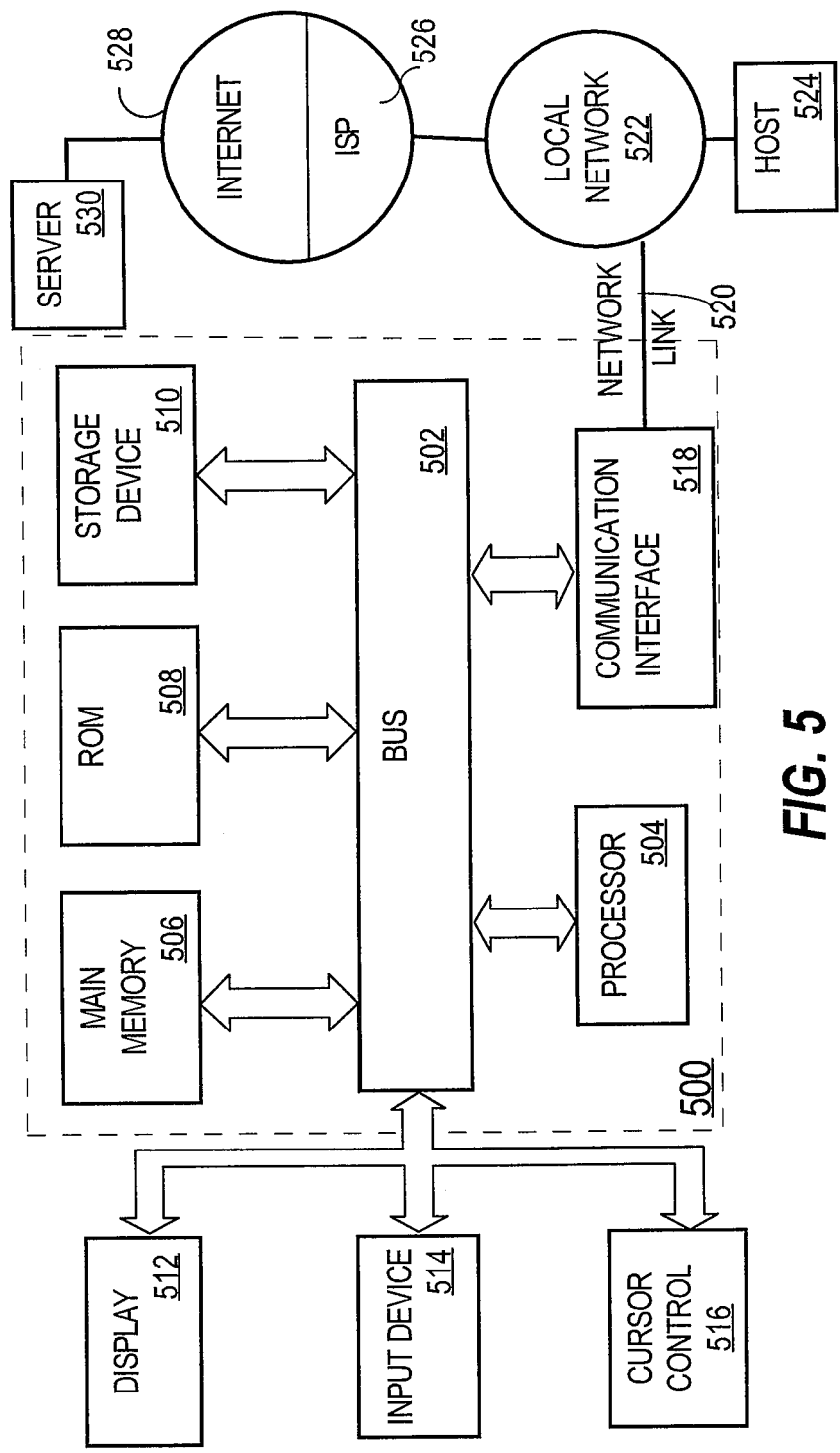
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:
1. A system comprising:
one or more processors; and
one or more computer-readable media storing instructions, which, when processed by the one or more processors cause:

receiving, at a network service from a first device that is separate from the network service, an electronic document to be printed;

in response to receiving, at the network service from the first device that is separate from the network service, the electronic document to be printed, generating by the network service a release code that uniquely identifies the electronic document that is locked by the network service;

sending, from the network service to a user, an email that includes the release code that uniquely identifies the electronic document that is locked by the network service;

wherein the release code may be used by a plurality of compatible printing devices to unlock the electronic document to be printed from the network service;

after sending, from the network service to the user, the email that includes the release code for the electronic document and before the electronic document is released from the network service to any printing device for printing, receiving the release code and one or more print criteria at the network service from a printing device that is separate from the network service, wherein the one or more print criteria select one or more portions of the electronic document to be printed, wherein the one or more portions of the electronic document are less than the entire electronic document, wherein the release code and the one or more print criteria are input through an operation panel that is associated with the printing device that is separate from the network service;

in response to receiving, at the network service from the printing device that is separate from the network service after sending the email that includes the release code for the electronic document and before the electronic document is released from the network service to any printing device for printing, the release code and the one or more print criteria selecting the one or more portions of the document to be printed that are less than the entire electronic document, the network service:

identifying, using the release code received at the network service, the electronic document;

generating, from the electronic document to be printed, a new electronic document that satisfies the print criteria and includes the one or more portions of the electronic document comprising less than the entire electronic document;

generating print data for the new electronic document; and providing, from the network service to the printing device that is separate from the network service, the print data for the new electronic document that satisfies the print criteria and includes the one or more portions of the electronic document comprising less than the entire electronic document.

2. The system of claim 1, wherein the print criteria identify one or more pages of the electronic document that the user wishes to print, wherein providing to the printing device, print data for the new electronic document that satisfies the print criteria and includes the one or more portions of the electronic document comprises causing the printing device to print only pages from the electronic document that are identified by the print criteria.

3. The system of claim 1, wherein the release code and the one or more print criteria comprise a modified release code that includes the release code sent to the first device and additional information that indicates the one or more portions of the electronic document to be printed.

4. The system of claim 3, wherein the modified release code includes the release code and a suffix that identifies the one or more portions of the electronic document.

5. The system of claim 1, further comprising instructions for generating a print preview for the electronic document; wherein the email that includes the release code further includes the print preview for the electronic document.

6. The system of claim 5, wherein the print preview comprises one or more thumbnail images or non-image data.

7. One or more non-transitory storage media storing instructions, which, when processed by one or more processors, cause:

receiving, at a network service from a first device that is separate from the network service, an electronic document to be printed;

in response to receiving, at the network service from the first device that is separate from the network service, the electronic document to be printed, generating by the network service a release code that uniquely identifies the electronic document that is locked by the network service;

sending, from the network service to a user, an email that includes the release code that uniquely identifies the electronic document that is locked by the network service;

wherein the release code may be used by a plurality of compatible printing devices to unlock the electronic document to be printed from the network service;

after sending, from the network service to the user, the email that includes the release code for the electronic document and before the electronic document is released from the network service to any printing device for printing, receiving the release code and one or more print criteria at the network service from a printing device that is separate from the network service, wherein the one or more print criteria select one or more portions of the electronic document to be printed, wherein the one or more portions of the electronic document are less than the entire electronic document, wherein the release code and the one or more print criteria are input through an operation panel that is associated with the printing device that is separate from the network service;

in response to receiving, at the network service from the printing device that is separate from the network service after sending the email that includes the release code for the electronic document and before the electronic document is released from the network service to any printing device for printing, the release code and the one or more print criteria selecting the one or more portions of the document to be printed that are less than the entire electronic document, the network service:

identifying, using the release code received at the network service, the electronic document;

generating, from the electronic document to be printed, a new electronic document that satisfies the print criteria and includes the one or more portions of the electronic document comprising less than the entire electronic document;

generating print data for the new electronic document; and providing, from the network service to the printing device that is separate from the network service, the print data for the new electronic document that satisfies the print criteria and includes the one or more portions of the electronic document comprising less than the entire electronic document.

8. The one or more non-transitory storage media of claim 7, wherein the print criteria identify one or more pages of the electronic document that the user wishes to print, wherein providing to the printing device, print data for the new electronic document that satisfies the print criteria includes the one or more portions of the electronic document comprises causing the printing device to print only pages from the electronic document that are identified by the print criteria.

9. The one or more non-transitory storage media of claim 7, wherein the release code and the one or more print criteria comprise a modified release code that includes the release code sent to the first device and additional information that indicates the one or more portions of the electronic document to be printed.

10. The one or more non-transitory storage media of claim 9, wherein the modified release code includes the release code and a suffix that identifies the one or more portions of the electronic document.

11. The one of more non-transitory storage media of claim 7, further comprising instructions for generating a print preview for the electronic document; wherein the email that includes the release code further includes the print preview for the electronic document.

12. The one or more non-transitory storage media of claim 11, wherein the print preview comprises one or more thumbnail images or non-image data.

13. A method comprising:
  receiving, at a network service from a first device that is separate from the network service, an electronic document to be printed;
  in response to receiving, at the network service from the first device that is separate from the network service, the electronic document to be printed, generating by the network service a release code that uniquely identifies the electronic document that is locked by the network service;
  sending, from the network service to a user, an email that includes the release code that uniquely identifies the electronic document that is locked by the network service;
  wherein the release code may be used by a plurality of compatible printing devices to unlock the electronic document to be printed from the network service;
  after sending, from the network service to the user, the email that includes the release code for the electronic document and before the electronic document is released from the network service to any printing device for printing, receiving the release code and one or more print criteria at the network service from a printing device that is separate from the network service, wherein the one or more print criteria select one or more portions of the electronic document to be printed, wherein the one or more portions of the electronic document are less than the entire electronic document, wherein the release code and the one or more print criteria are input through an operation panel that is associated with the printing device that is separate from the network service;
  in response to receiving, at the network service from the printing device that is separate from the network service after sending the email that includes the release code for the electronic document and before the electronic document is released from the network service to any printing device for printing, the release code and the one or more print criteria selecting the one or more portions of the document to be printed that are less than the entire electronic document, the network service:
    identifying, using the release code received at the network service, the electronic document;
    generating, from the electronic document to be printed, a new electronic document that satisfies the print criteria and includes the one or more portions of the electronic document comprising less than the entire electronic document;
    generating print data for the new electronic document; and
    providing, from the network service to the printing device that is separate from the network service, the print data for the new electronic document that satisfies the print criteria and includes the one or more portions of the electronic document comprising less than the entire electronic document.

14. The method of claim 13, wherein the print criteria identify one or more pages of the electronic document that the user wishes to print, wherein providing to the printing device, print data for the new electronic document that satisfies the print criteria and includes the one or more portions of the electronic document comprises causing the printing device to print only pages from the electronic document that are identified by the print criteria.

15. The method of claim 13, wherein the release code and the one or more print criteria comprise a modified release code that includes the release code sent to the first device and additional information that indicates the one or more portions of the electronic document to be printed.

16. The method of claim 13, further comprising generating a print preview for the electronic document; wherein the email that includes the release code further includes the print preview for the electronic document.

17. The method of claim 16, wherein the print preview comprises one or more thumbnail images or non-image data.

18. An apparatus comprising:
  a network interface communicatively coupled to one or more networks;
  a user interface configured to receive input from a user and display output to the user;
  one or more processors; and
  one or more computer-readable media storing instructions, which, when processed by the one or more processors, cause the apparatus to perform operations comprising:
    receiving, through the user interface, a release code that was sent to the user by a network print service in an email and one or more print criteria;
    wherein the release code uniquely identifies a print job that is locked by the network service;
    wherein the release code may be used by a plurality of compatible printing devices to unlock an electronic document that is part of the print job from the network service;
    in response to receiving, through the user interface, a release code that was sent to the user by the network print service in the email and the one or more print criteria, sending, through the network interface to the network print service before the electronic document is released from the network service to any printing device for printing, the release code that was sent to the user by the network print service and one or more print criteria selecting one or more portions of an electronic document corresponding to the release code;

after sending, through the network interface to the network print service the release code that was sent to the user by the network print service and one or more print criteria selecting one or more portions of an electronic document corresponding to the release code, receiving, through the network interface from the network print service, particular print data for the one or more portions of the electronic document corresponding to the release code;

wherein the particular print data was generated at the network service for a new electronic document that satisfies the print criteria and includes the one or more portions of the electronic document comprising less than the entire electronic document; causing, based on the particular print data for the new electronic document, printing of the new electronic document that satisfies the print criteria and includes the one or more portions of the electronic document comprising less than the entire electronic document;

wherein the new electronic document was generated by the network service using the electronic document that is part of the print job locked by at the network service;

wherein the network print service is separate from the apparatus.

19. The apparatus of claim 18, the apparatus further comprising a print subsystem configured to print one or more documents based on corresponding print data; wherein causing, based on the print data for the new electronic document, printing of the new electronic document comprises the apparatus printing, through the print subsystem, the new electronic document.

20. The apparatus of claim 18, wherein causing, based on the print data for the new electronic document, printing of the new electronic document comprises sending the print data to a printing device.

* * * * *